May 25, 1926.
W. L. DEMING
LAWN SPRINKLER
Filed Oct. 25, 1923
1,586,294
2 Sheets-Sheet 2
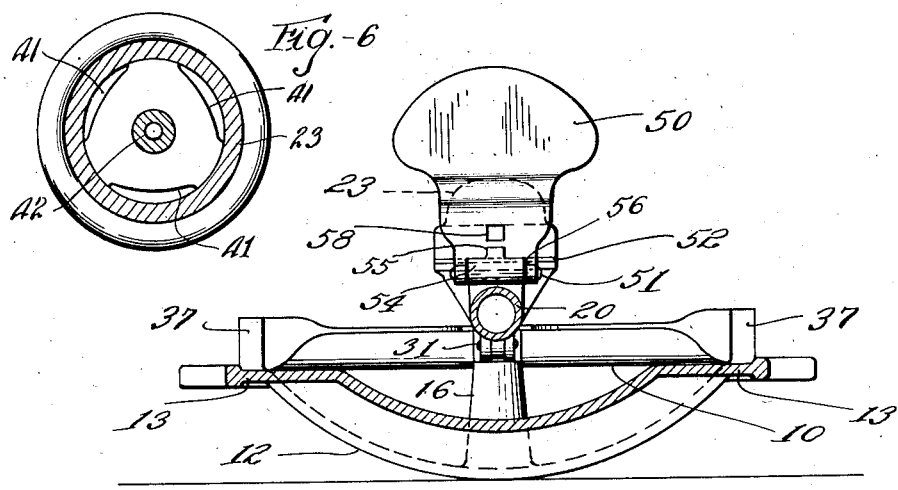
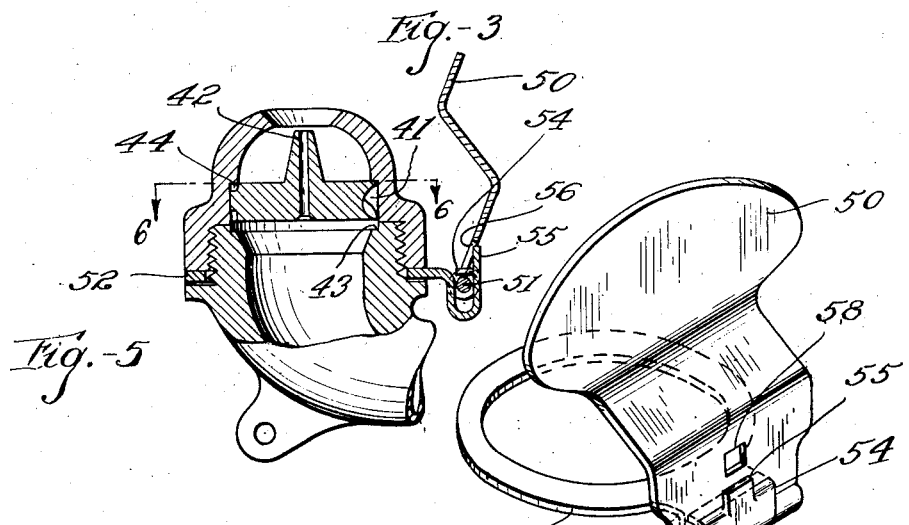
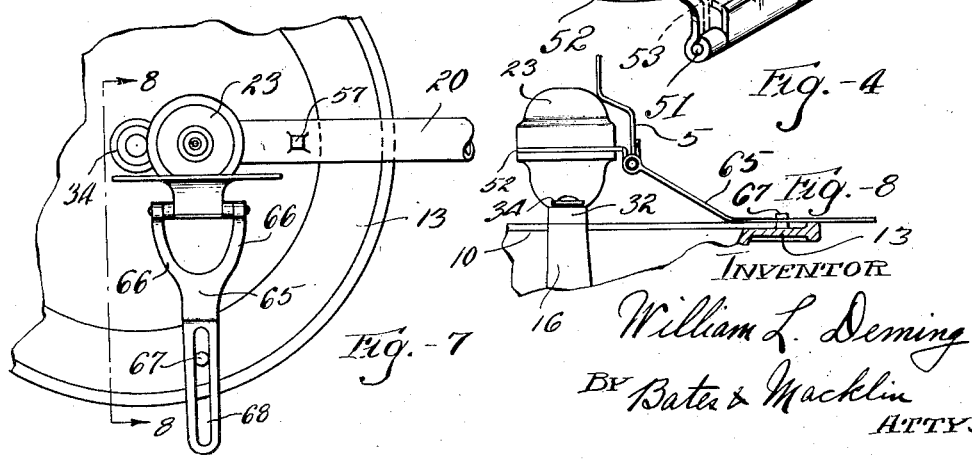

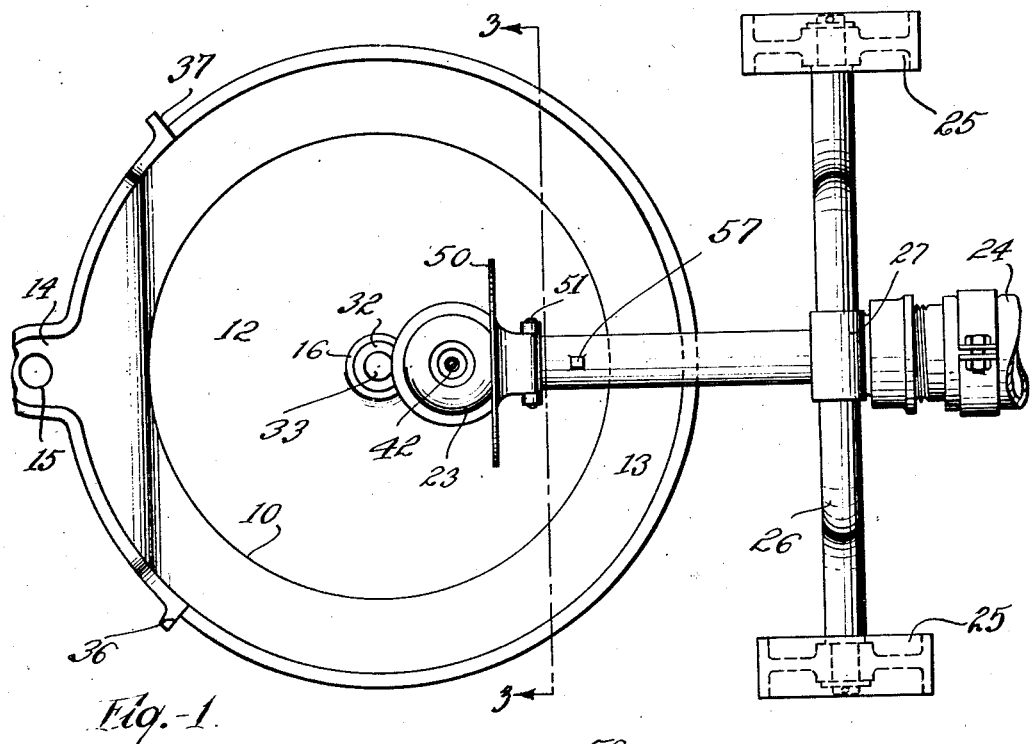
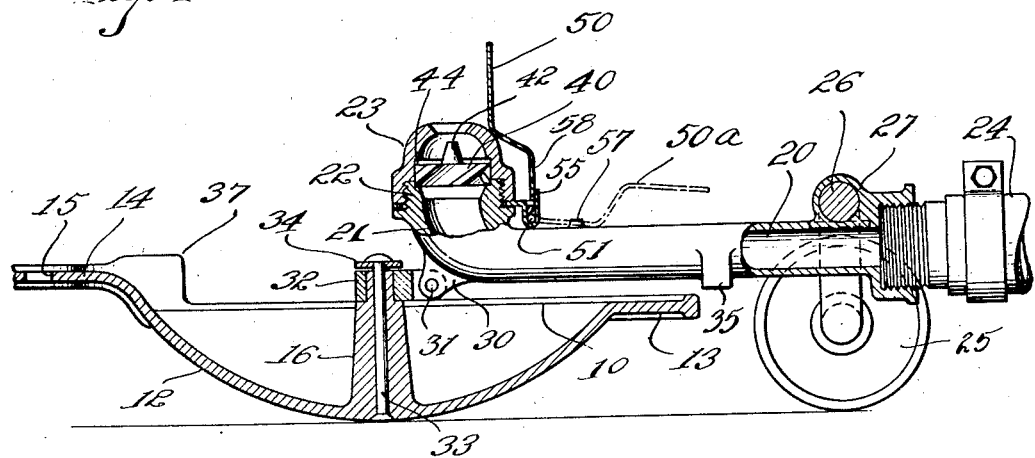

Patented May 25, 1926.

1,586,294

UNITED STATES PATENT OFFICE.

WILLIAM L. DEMING, OF SALEM, OHIO, ASSIGNOR TO THE DEMING COMPANY, OF SALEM, OHIO, A CORPORATION OF OHIO.

LAWN SPRINKLER.

Application filed October 25, 1923. Serial No. 670,695.

One of the principal objections to lawn sprinklers heretofore used is that the sprinkler can not be readily moved from place to place without being tipped, particularly where the ground is rough and uneven. This necessitates a shutting off of the water, and then a raising and transporting of the sprinkler to the desired location. To overcome this objection a form of lawn sprinkler has been designed which comprises a comparatively large flat hollow ring usually of sheet brass, having holes punched at spaced intervals to produce the desired spray. These holes, however, frequently become filled with pipe scale and sediment wherefore the pressure becomes sufficiently great to rupture the seams. Other types of lawn sprinklers have been designed with the intention of producing a spray which does not require the spaced openings, but usually these sprinklers have been of such construction that they are easily tipped.

One of the objects of my invention, therefore, is the provision of a sprinkler which may be readily moved over rough and uneven ground without tipping, and which may be turned in any direction without twisting or kinking the hose. In this connection, my invention provides a construction which avoids wearing of the hose when the sprinkler is turned.

Another object of the invention is the provision of simple readily positioned means for enabling the spray to be directed in a predetermined direction without materially deflecting the form of the spray. This is particularly advantageous for sprinkling lawns adjacent sidewalks to prevent wetting of the side-walk or for sprinkling a putting green without wasting water on the adjacent fairway.

The means for carrying out the above objects will hereinafter be fully set forth in detail in the following description, while the essential characteristics of my invention will be summarized in the claims.

In the drawings, Fig. 1 is a plan view of a lawn sprinkler made in accordance with my invention; Fig. 2 is a longitudinal vertical section partly in elevation of the sprinkler; Fig. 3 is a section taken on the line 3—3 in Fig. 1; Fig. 4 is a perspective view showing the spray deflector together with the means for adjustably mounting it upon the sprinkler; Fig. 5 is a section taken on an enlarged scale through the nozzle: Fig. 6 is a section taken on the line 6—6 in Fig. 5; and Figs. 7 and 8 are top and side views respectively of a locking device adapted for use with my invention.

My invention is illustrated in the preferred form as comprising a forward supporting or guiding member or skid indicated generally at 10, and a carriage or rearward supporting member which is arranged to support the spray nozzle and to receive the hose. The guiding member preferably has a curved ground engaging surface 12 to facilitate movement over rough and uneven ground. The forward member is preferably a casting having the interior thereof hollow and having a peripheral flange 13 which is arranged to merge with a lateral extension 14 in which an opening 15 is shown. A suitable cord or chain may be extended through the opening for enabling the sprinkler to be drawn across the ground without requiring the water to be shut off.

The carriage illustrated embodies a conduit 20, the forward end of which is turned upwardly as at 21 and is threaded, as at 22, to receive a nozzle cap 23. The rearward end of the conduit is arranged to receive a hose indicated at 24. The carriage acts as a trailer and is supported adjacent the rearward end thereof by wheels 25 which may be disposed at opposite ends of a cross-bar 26. This cross-bar may be rigidly connected to the conduit through an enlargement 27 adjacent the upper portion of the conduit.

I prefer to employ a universal connection between the forward support and the carriage, and to this end I have shown the forward end of the carriage as having a lug 30 which is pivotally connected at 31 to a collar 32. The collar is shown as being rotatably mounted upon a post 16, which is carried by the forward support. A pin 33 may extend through the post and be provided with a washer 34 for retaining the collar in adjusted position. Thus, the pivotal connection 31 permits movement of the carriage in a vertical plane, while the collar 32 permits movement of the carriage in a horizontal plane with relation to the forward supporting member.

To limit the angular movement of the member 10 with relation to the carriage, I have shown a lug 35 on the conduit 20 and I have illustrated shoulders 36 and 37 on the member 10 which are arranged to be engaged by the lug. This prevents the member 10 from being turned a complete revolution, wherefore the sprinkler must be turned in a circle having a sufficiently large radius to protect the hose.

The nozzle construction as shown in the drawings is directed toward the attainment of a conical spray together with a vertical stream at the center of the spray. I accomplish this by the use of a distributor 40 which is arranged to be positioned within the cap 23. The distributor is provided with spiral passageways 41 which are used for imparting a spiral motion to the water to obtain the conical spray. Adjacent the mid-portion of the distributor I have shown an opening 42 for obtaining the vertical stream. As shown the distributor is free to move vertically within the nozzle cap, there being shoulders 43 in the conduit for limiting downward movement thereof, and shoulders 44 in the cap for limiting upward movement thereof. This slight vertical movement tends to keep the passage-ways free of particles of scale and sediment.

For restricting the area covered by the spray, I employ a deflector 50 which may be hinged, as at 51, to a collar 52. The collar is arranged to be disposed intermediate the conduit and nozzle cap and to be rotatable with relation to the cap. In the preferred form, the collar is provided with a lateral extension 53 which is shown as being curved downwardly, then upwardly and inwardly at 54 to provide a companion member for the deflector hinge.

An ear 55 is shown as being struck upwardly from the portion 54 to engage the deflector and to prevent movement thereof away from the nozzle. The deflector, moreover, is shown as having the mid-portion thereof recessed as at 56, to receive the portion 54 which recess is sufficiently deep to permit a lost motion connection between the pivot pin 51 and the portion 54 on the collar. An advantage of this construction is that normally the deflector is held by gravity in the position shown in Fig. 4, wherein the pivot pin is in the lowermost position. If desired, however, the deflector may be raised until the recessed portion 56 therein clears the top of the ear 55 as indicated in Fig. 5 wherefor the deflector when not in use, may be folded downwardly as shown by the broken lines 50^A in Fig. 2. This also reduces the overall size of the sprinkler, and tends to prevent breakage of the baffle during shipment.

To lock the deflector in the lowered position (as illustrated by broken lines in Fig. 2) I have illustrated a lug 57 in the top of the conduit as being arranged to enter an aperture 58 in the deflector. When the deflector is in upright position it is locked against vibratory movement by reason of the fact that the forward side is in abutting engagement with the nozzle cap while the rearward side is in engagement with the forward face of the ear 55.

In Figs. 7 and 8 I have illustrated a device which may be employed for locking the deflector to the bowl. This is useful for maintaining the spray along the proper path while the bowl is being turned and the sprinkler is being changed from one location to another. In the preferred form, the means for locking the deflector to the bowl is illustrated as a plate 65 which may be hinged to the same pin 51 on which the deflector is mounted. The plate preferably has spaced arms 66, adjacent the hinged connection so that it may clear the lug 57 on the conduit when the deflector is folded downwardly when not in use. The plate, moreover, preferably has a slot 68 adjacent the outer end thereof which is arranged to receive a lug 67 as shown in Fig. 8. When the plate is thus disposed over the lug 67, then the deflector is locked with relation to the bowl, wherefore rotation of the bowl effects a revolution of the deflector about the axis of the nozzle.

An advantage of a sprinkler made in accordance with my invention is that it may be drawn over the ground in any direction and over rough surfaces, without tipping and consequently without necessitating the shutting off of the water for changing the location of the sprinkler. The bowl shaped supporting member provides a receptacle for receiving the water which falls from the vertical stream, thus providing a satisfactory bird path. The universal connection between the guiding member and the carriage facilitates movement of the sprinkler, while the overhanging conduit prevents wearing of the hose due to turning of the guiding member.

I claim:

1. A lawn sprinkler having in combination a nozzle, of a ground engaging member therefor in the form of a hollow bowl, means for attaching said member to the nozzle by a universal connection, said member being adapted to hold the nozzle in upright position, and to enable it to be drawn across the ground without being tipped.

2. In a lawn sprinkler, the combination with a nozzle, of a conduit therefor, a skid in the form of a bowl having a universal connection with one end of said conduit, and ground engaging means carried by the opposite end of said conduit and having wheels.

3. In a lawn sprinkler, the combination with a conduit, of a nozzle cap therefor, an annular member surrounding the conduit and being positioned thereon by said cap, a deflector having a lost-motion hinge connection with said member, means normally preventing the deflector swinging about the hinge, said means being so positioned that it is cleared when the deflector is raised whereby the deflector may be raised with relation to the member, and then swung about the hinge connection to adjust the deflector with relation to said conduit.

4. In a lawn sprinkler, the combination with a conduit, of a member rotatably mounted thereon, said member having an extension projecting downwardly, then laterally and upwardly to form part of a hinge connection, a deflector comprising a companion member for said hinge connection, an ear projecting upwardly from said extension, said deflector having a recess adjacent said ear and normally below it whereby the deflector when raised sufficiently to permit it to clear the ear may be swung about the pivotal connection.

5. In a lawn sprinkler, the combination with a conduit and a support for holding it in upright position, of a member rotatably mounted on the conduit, said member having a lateral extension thereon, a spray deflector hinged to said member, said deflector being adapted to engage a portion of said extension for holding it in upright position against the force of the spray, there being provision for lost motion in the hinge connection between said member and deflector, whereby the deflector may be raised to clear the member and then swung downwardly into an approximately horizontal position.

6. In a lawn sprinkler, the combination with a bowl-shaped skid, of a carriage having a universal connection therewith, the skid having a pair of shoulders projecting upwardly therefrom and the carriage having a shoulder adapted to engage the shoulders on the skid for limiting angular movement of the skid with relation to the carriage, the outer end of the carriage having a transverse member rigidly attached thereto, wheels pivotally connected to said member adjacent the ends thereof, means for connecting the carriage to a hose intermediate said wheels, and a nozzle mounted on said carriage above the skid.

7. In a lawn sprinkler, the combination with a bowl-shaped skid having a centrally extending post, a collar rotatably mounted on the post, a carriage pivotally connected to said collar, a nozzle mounted on the carriage over said skid whereby a portion of the spray from said nozzle is caused to fall into the skid and ground engaging means on said carriage, said means and skid cooperating to provide a three-point support for said carriage.

8. The combination of a bowl, a conduit having a universal joint connection therewith and having an upwardly turned elbow terminating in a nozzle, a hose coupling at the rear end of the conduit, and a wheel support for such rear end.

9. In a lawn sprinkler, the combination of a skid in the form of a bowl with an upwardly extending post therein, a conduit terminating in an upwardly extending elbow, a spray nozzle on the end of the elbow, a universal joint connecting the conduit adjacent the elbow with the upper end of said post, means for supporting the rear portion of the conduit, and means for attachment of a hose to said conduit.

10. In a lawn sprinkler, the combination of a skid in the form of a bowl with an upwardly extending post therein, a conduit terminating in an upwardly extending elbow, a spray nozzle on the end of the elbow, a universal joint connecting the conduit adjacent the elbow with the upper end of said post, a transverse bar secured to the rear portion of the conduit, caster wheels carried by the bar near its ends, and a screw connection at the rear of the conduit adapted for attachment of the hose, said hose connection being disposed beyond the marginal edge of said skid with relation to the conduit.

11. In a lawn sprinkler, the combination of a skid in the form of a bowl with an upwardly extending post therein, a conduit terminating in an upwardly extending elbow pivotally connected to said post, a means for attachment of a hose to said conduit, and said bowl having a pair of upwardly extending lugs adapted to coact with a stop on the conduit to limit the angular movement of the bowl with relation to the conduit.

12. In a lawn sprinkler, the combination with a conduit, of a nozzle cap carried thereby, a collar loosely disposed intermediate the cap and the body of the conduit and having a lateral extension, a deflector hinged to said collar and having a portion thereof adapted to engage said cap, said deflector also having another portion adapted to engage the extension behind it and to be held normally in engagement therewith.

13. In a lawn sprinkler, the combination with a nozzle, of a rotatable support therefor, a spray deflector associated with the nozzle and revoluble about the axis thereof and means for locking the deflector to said support.

14. In a lawn sprinkler, the combination with a conduit, of a nozzle carried thereby, a spray deflector carried by the conduit and revoluble about the axis of the nozzle, a rotatable support for said conduit, and means for locking the deflector to said support whereby rotation of the support causes the deflector to revolve about the axis of the nozzle.

In testimony whereof, I hereunto affix my signature.

WILLIAM L. DEMING.